(12) United States Patent
Provost et al.

(10) Patent No.: US 9,507,699 B2
(45) Date of Patent: Nov. 29, 2016

(54) STREAMLINED TESTING EXPERIENCE

(75) Inventors: Peter G. Provost, Denver, CO (US);
Ian M. Bavey, Sammamish, WA (US);
Todd L. King, Bothell, WA (US);
Oscar Calvo-Rodriguez, Duvall, WA (US); Bradley J. Wilson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 453 days.

(21) Appl. No.: 13/161,690

(22) Filed: Jun. 16, 2011

(65) Prior Publication Data
US 2012/0324427 A1    Dec. 20, 2012

(51) Int. Cl.
*G06F 11/00* (2006.01)
*G06F 11/36* (2006.01)
*G06F 11/34* (2006.01)

(52) U.S. Cl.
CPC ....... *G06F 11/3688* (2013.01); *G06F 11/3409* (2013.01); *G06F 11/3684* (2013.01)

(58) Field of Classification Search
CPC ..... G06F 8/20–8/34; G06F 11/3466–11/3688; G06F 11/3457; G06F 11/3409; G06F 11/3419
See application file for complete search history.

(56) References Cited

U.S. PATENT DOCUMENTS

| | | | |
|---|---|---|---|
| 7,020,797 B2 | 3/2006 | Patil | |
| 7,509,538 B2 * | 3/2009 | Triou, Jr. | G06F 11/3688 714/48 |
| 7,694,181 B2 | 4/2010 | Noller et al. | |
| 8,479,164 B2 * | 7/2013 | Becker | G06Q 10/06 717/124 |
| 9,329,981 B2 * | 5/2016 | Mizobuchi | G06F 11/3688 |
| 2004/0122928 A1 * | 6/2004 | Arcand | 709/223 |
| 2004/0221270 A1 * | 11/2004 | Witchel et al. | 717/124 |
| 2007/0094189 A1 * | 4/2007 | Yamamoto et al. | 706/45 |
| 2008/0010535 A1 * | 1/2008 | Dasgupta | G06F 11/3688 714/38.1 |
| 2008/0172652 A1 * | 7/2008 | Davia et al. | 717/124 |
| 2009/0144698 A1 * | 6/2009 | Fanning et al. | 717/120 |
| 2009/0199045 A1 * | 8/2009 | Kasubuchi et al. | 714/38 |
| 2010/0100871 A1 | 4/2010 | Celeskey et al. | |
| 2010/0186003 A1 * | 7/2010 | Shapiro et al. | 717/126 |
| 2012/0042302 A1 * | 2/2012 | Sikandar et al. | 717/125 |
| 2012/0233596 A1 * | 9/2012 | Adler et al. | 717/124 |
| 2012/0253728 A1 * | 10/2012 | Chamas | G06F 11/2294 702/109 |
| 2012/0284697 A1 * | 11/2012 | Choppakatla et al. | 717/124 |
| 2015/0100829 A1 * | 4/2015 | Nanjundappa | G06F 11/0748 714/38.1 |
| 2016/0162392 A1 * | 6/2016 | Hu | G06F 11/3688 714/38.1 |

OTHER PUBLICATIONS

Bryce et al., Test prioritization for pairwise interaction coverage, May 2005, 7 pages.*

"Improving Testing Efficiency: Agile Test Case Prioritization", Retrieved at <<http://www.compaid.com/caiinternet/ezine/SBO-Testing.pdf>>, Retrieved Date: Mar. 31, 2011, pp. 7.

"Wind River Framework for Automated Software Testing (FAST)", Retrieved at <<http://www.windriver.com/products/product-notes/PN_FAST_Testing_0310.pdf>>, Retrieved Date: Mar. 31, 2011, pp. 9.

(Continued)

*Primary Examiner* — Thuy Dao
(74) *Attorney, Agent, or Firm* — Kevin Sullivan; Kate Drakos; Micky Minhas

(57) ABSTRACT

Tests can be categorized as important with respect to ensuring software functions correctly as a function of one or more rules that define importance. The rules can be configurable to enable control of categorization. Further, tests categorized as important can be highlighted in some manner, for instance by displaying important tests in a group designated for such tests.

18 Claims, 10 Drawing Sheets

(56) References Cited

OTHER PUBLICATIONS

Mitchell, et al., "QMTest: A Software Testing Tool", Retrieved at <<http://www.python.org/workshops/2002-02/papers/01/index.htm>>, Retrieved Date: Mar. 31, 2011, pp. 10.

Kearney Daniel, "Data Conversion Testing", Retrieved at <<http://www.softwaretestingclub.com/profiles/blogs/751045:BlogPost:7763>>, Oct. 11, 2007, pp. 3.

"Testing Tools", Retrieved at <<http://msdn.microsoft.com/en-us/library/dd373661(v=vs.85).aspx>>, Retrieved Date: Mar. 31, 2011, pp. 2.

* cited by examiner

STREAMLINED TESTING EXPERIENCE

BACKGROUND

Software testing generally pertains to determining whether software functions correctly. More specifically, software testing is a process of locating and reporting defects (a.k.a. bugs) and ensuring the defects are fixed by generating and executing tests on software. In other words, testing is a cyclic workflow including running generated tests and fixing defects. As a result, testing can improve the quality and reliability of software.

Testing can be performed at various times in a development process. Traditionally, software is coded in accordance with a design and subsequently tested toward the end of the development process just prior to release. Newer development models often utilize test-driven development, which involves generating tests prior to authoring code. As a result, development is focused on producing code that passes tests defining failure conditions for new or improved functionality. Of course, a combination of these and other approaches can be employed such that testing can occur at any time in the development process. For example, code can be written and tested incrementally by a developer.

Several different types of testing can be employed at various points in a development process including unit testing, integration testing, system testing, and acceptance testing. Unit testing involves determining whether individual units of source code work properly, wherein a unit is the smallest testable portion of code (e.g., modules, classes, functions . . . ). Integration testing involves testing groups of units. System testing goes a step further and seeks to validate an entire software application. Finally, acceptance testing seeks to exercise the application with real data (e.g., customer data).

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to streamlined testing experience. Software tests can be categorized as important at a given point in time as a function of one or more rules, among other things. Such rules define whether a test is important and are configurable (e.g., added, removed, or modified). Stated differently, at least a subset of applicable tests can be classified as important at a given point in a testing workflow based on a specific definition of importance. Tests categorized as important, or in other words, important tests, can be presented along with a mechanism to facilitate initiating execution of at least a subset of the important tests. For example, a group of important tests can be displayed in a user interface with an option to run the group of important tests.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Software testing typically involves running a test, fixing code, and re-running the test. A large number of tests can be run to exercise a piece of software. For instance, an application can be associated with thousands of unit tests. Conventional technologies seek to aid a tester by identifying tests that have passed, failed, or have not yet run, for example in separate corresponding lists. Subsequently, a tester can select tests to run from one or more of the lists. However, such an approach does not scale well.

Details below are generally directed toward a streamlined testing experience. Tests can be categorized as important at a given point in time as a function of one or more rules, wherein important refers to tests of value in ensuring software functions correctly. Important tests can be presented to a user along with a mechanism to initiate execution of at least a subset of the important tests. In one embodiment, important tests can be displayed as a distinct group. For example, tests can be collected and aggregated from different collections (e.g., passed, failed, have not run . . . ) into a single collection of important tests. This streamlined approach can increase developer productivity, for example by reducing the number of tests that need to be run after every change, and thus shortens the software development cycle.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
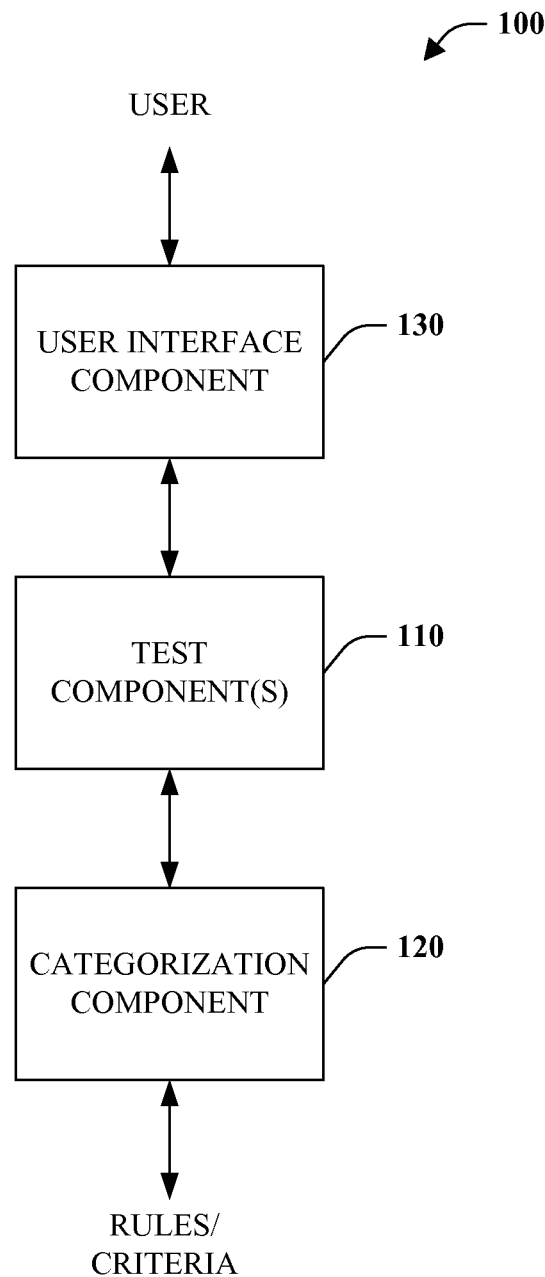
FIG. 1 is a block diagram of a system that facilitates software testing.

Referring initially to FIG. 1, a system 100 that facilitates testing is illustrated. The system 100 includes one or more test components 110. The test components 110 can correspond to software tests, which when run, or executed, verify that software (e.g., program that directs the operation of a computer by way of a series of computer-executable instructions), or a portion thereof, functions correctly. In accordance with one embodiment, the tests can be unit tests. For purposes of clarity and brevity, the subject disclosure focuses discussion on unit tests and a testing workflow related to unit tests. However, the claimed subject matter is not limited thereto. By way of example, and not limitation, software tests can correspond to various integration or system tests, among others.

Categorization component 120 is configured to categorize or classify tests as important, or more specifically important to run/execute, at a given time. Accordingly, important tests can be a subset of applicable tests that are of value with respect to determining whether a system-under-test functions correctly. For example, if a developer makes a small change to source code of a piece of software, the important tests can be solely those tests that need to run to ensure, for instance to some degree, that the change does not introduce a defect that will cause the software to function incorrectly. What tests are deemed important, versus unimportant, can be dictated by one or more rules, or criteria, that define importance, among other things.

To facilitate understanding, consider, for example, a point in a testing workflow where a number of tests have failed, passed, and have not yet run. It is likely that tests that previously failed or have not yet run are important to execute and can be categorized as such. Conventionally, tests have been grouped based on such test results, and a tester iterates through the groups and selects tests to run. However, this approach becomes problematic for a tester in the presence of a large number of tests, such as thousands of unit tests. Furthermore, importance can be defined in a manner that outperforms manual user selection. As a result, fewer tests can be designated for execution resulting in improved developer productivity, among other things.

Tests can be categorized as important in various manners. In accordance with one embodiment, a test property can denote the test as important, for example by setting an importance flag or the like. In another embodiment, test code itself can be altered to note a test as important. By way of example, a category or trait conventionally utilized to enable a developer to note something interesting about a test can be modified to enable a dynamic indication of whether a test is important or not a given time.

Note that a categorization can be dynamic in nature. In other words, a test may be important at one point in time and unimportant at another point in time based on surrounding context (e.g., test result, changes to test and/or code . . . ). Accordingly, the categorization component 120 can be configured to perform dynamic categorization.

Figure 2:
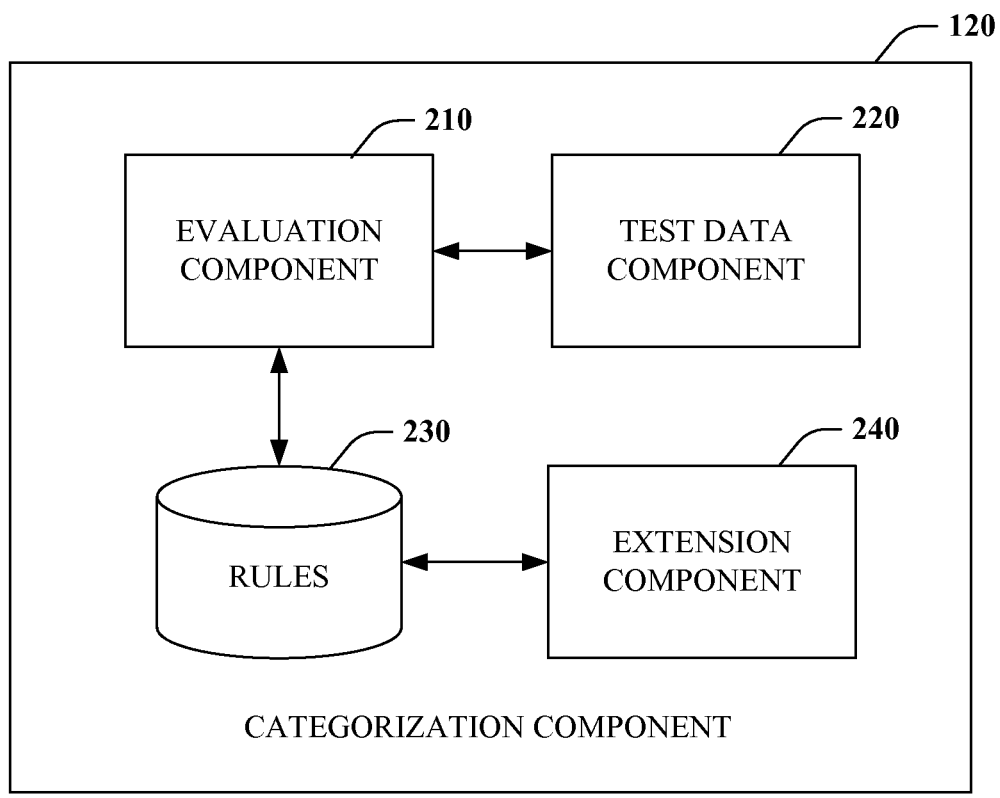
FIG. 2 is a block diagram of a representative categorization component.

Turning attention to FIG. 2 a representative categorization component 120 is depicted in further detail. Evaluation component 210 is configured to evaluate tests to determine whether tests should be categorized, or classified, as important at a given time. In furtherance thereof, the evaluation component 210 can interact with test data component 220 that is configured to provide data regarding tests. The test data component 220 can receive, retrieve, or otherwise obtain or acquire test data from an external source or service and/or perform various actions itself and return results. For example, the test data component 220 can indicate whether a test has passed, failed, or has not been run yet. As another example, the test data component 220 can supply test impact analysis results that identify lines of code that a test executes. In general, the test data component 220 is configured to supply any data pertaining to one or more test including, but not limited to a time since a test last passed, historical pass/fail ratio, code coverage metrics, test redundancy data, and/or other statistical metrics on either a test of the system under test (e.g., software application).

The evaluation component 210 can also utilize one or more rules, housed in rules store 230, that define when a test is important. For example, one rule can identify an important test as one that has not passed recently (e.g., within a predetermined time), which can include new tests that have not been run. In other words, the test passed previously but the test has not been run in days, for example. Another rule can indicate that an important test is one that is impacted by changes made. In other words, changes made to lines of code that a test executes.

Further, the one or more rules are not limited to defining an important test. Rules can also identify tests that are not important or unimportant with respect to verifying a piece of software operates properly. Further, a test can be deemed important by satisfying a first rule, which can be negated by second rule defining an unimportant test. Consider for instance redundant tests. By way of example and not limitation, if a unit test and a functional test have common code paths and test the same thing, the functional test can be deemed unimportant further reducing the number of tests that need to run, for example for a developer to feel confident that any changes made do not cause the software to operate improperly, or incorrectly.

Moreover, the rules are configurable such that rules can be added, removed, or modified. For example, the predetermined time in the rule specifying an important test as one that has not passed recently can be modified or the rule can be removed.

Extension component 240 is configured to enable new rules to be added to the rules store 230 for use by the categorization component 120. The extension component 240 can thus function as an interface to the rules store 230 to allow new rules to be plugged in. As a result, the categorization component 120 can be open to third-party developers to allow for custom enterprise-specific rules, for example.

Up to this point, categorization has been described with respect to two buckets—important or unimportant. However, finer grained categorization is also possible. Static and/or dynamic analysis can be employed with some logic that understands how code systems work to categorize tests differently. For example, important tests can include subcategories defining types of tests (e.g., user interface, business logic . . . ) and/or how fast or slow a test executes. Further yet, tests can be organized (e.g., prioritized) based on one or more factors.

Returning briefly to FIG. 1, the system 100 includes user interface component 130 that is configured to present and enable interaction with important tests, among other things. The important tests can be identified by analyzing a property or other annotation noting whether the test is categorized as important. Generally, the user interface component 130 can highlight, or emphasize, important tests. In accordance with one embodiment, the user interface component 130 can present important tests in a group. Further, the tests can be ordered in some manner and/or further collected into subgroups based on test results (e.g., pass, fail) and/or additional test properties (e.g., execution time). In addition, the user interface component 130 can provide a mechanism for initiating execution of at least a subset of important tests.

Figure 3:
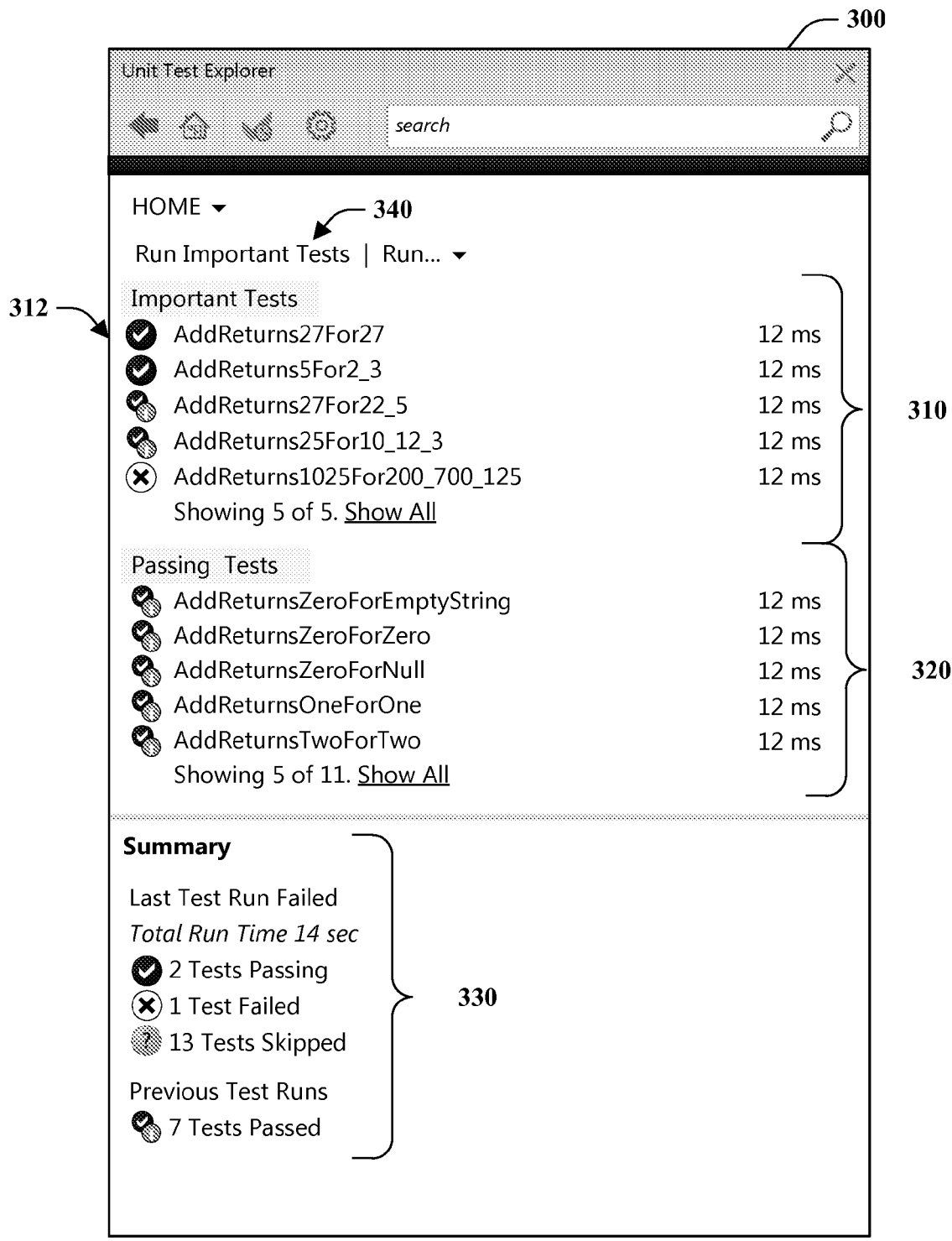
FIG. 3 is a screenshot of an exemplary user interface.

FIG. 3 is a screenshot 300 of an exemplary graphical user interface that can be provided by the user interface component 130. As shown, there are two groups of tests, namely group 310 and group 320. Group 310 provides a set of important tests that satisfy one or more rules or criteria defining important tests. Group 320 displays a set of tests that have passed. Additional groups not depicted here could correspond to failed tests and skipped tests, for example. Summary 330 is also provided that summarizes actions corresponding to a previous test run. Returning to group 310 corresponding to the important tests, a number of graphical icons corresponding to test results or, in other words, test states, are displayed. Here, the encircled check mark indicates a test passed, the encircled "X" denotes a tests failed, and the encircled check mark with an encircled "I" designates a test passed but is stale or out of date (e.g., test passed some time (e.g., minutes, hours, days . . . ) prior to the most recent execution of tests). In other words, the tests are annotated with test state. Further, note that the important tests are ordered in group 310 based on test state, namely passed followed by passed but stale followed by failed. Furthermore, the user interface includes an element 340 that can initiate execution of the group 310 of important tests with a single gesture (e.g., click). Of course, a user could also select a subset of the important tests for execution from the tests in group 310. Of course, this is only one possible user interface. Various other combinations and permutations of graphical elements can be used to provide similar functionality. Accordingly, the claimed subject matter is not limited to the exemplary graphical interface provide by screenshot 300.

Figure 4:
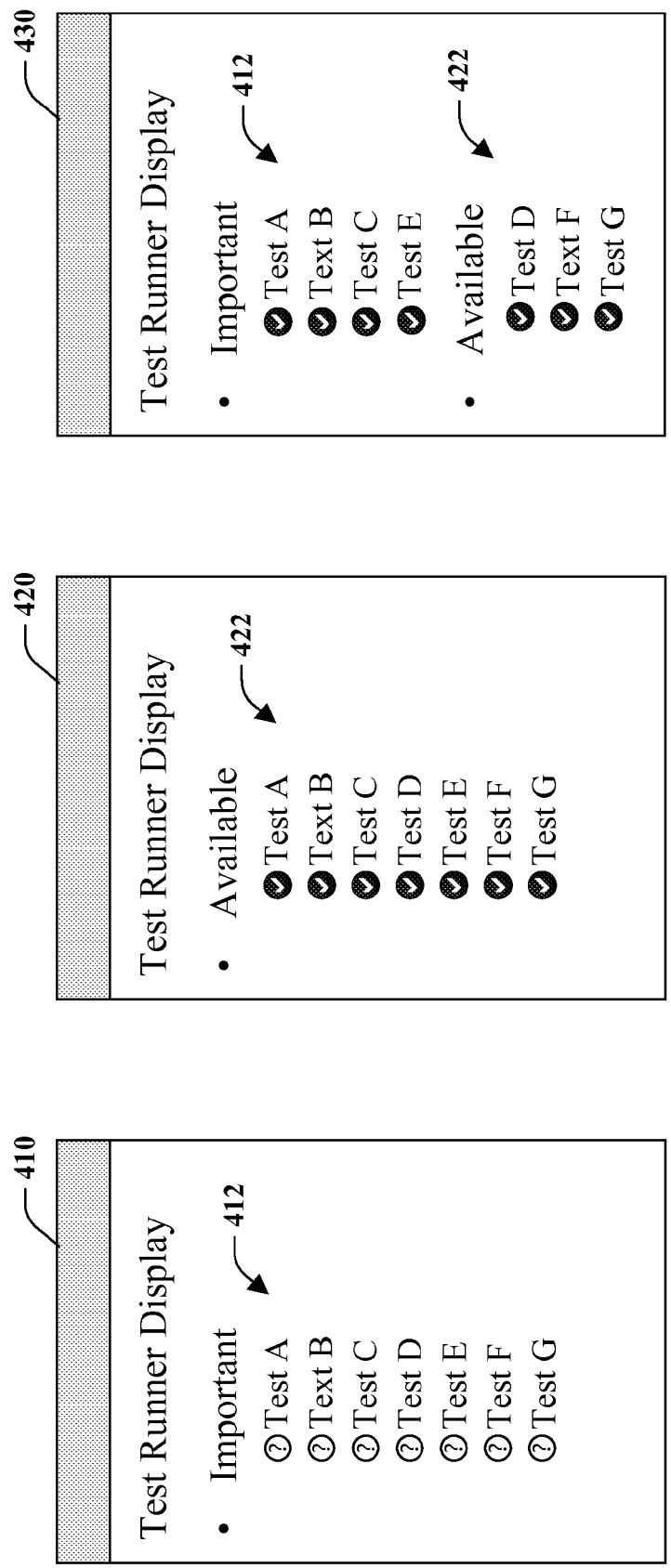
FIGS. 4-6 illustrate a plurality screenshots associated with an exemplary test workflow.

What follows is a description of an exemplary test workflow that utilizes impact data to categorize tests as important. A number of screenshots of a simplified user interface are provided by FIGS. 4-6 to aid understanding. However, the claimed subject matter is not intended to be limited to the exemplary workflow or the screenshots of FIGS. 4-6 (410, 420, and 430, 510, 520, and 530, and 610, 620, and 630, respectively). Rather the test workflow and corresponding screenshots are provided solely to facilitate clarity and understanding with respect to various disclosed aspects of the claimed subject matter.

Note that graphical icons associated with each test can identify test state information. In these examples, an encircled check mark signifies a test passed, an encircled check mark and encircled "I" denotes a test passed but is stale, an encircled "X" indicates a test failed, and an encircled question mark signifies an unknown state.

Upon initially performing a build of an application (e.g., converting source code to computer executable code), no history or impact data exists. Accordingly, all tests are important. As shown in screenshot 410 of FIG. 4, all tests A-G are displayed in single important group 412 with a graphical icon denoting an unknown state.

Next, assume a developer choses to run all important tests and all tests pass. In this case, there are no important tests accordingly there is no group of important tests to be displayed. Consequently, all tests can be designated with a pass icon and grouped in another group 422 corresponding simply to available tests, as depicted in screenshot 420. In this exemplary scenario, the group 422 of available tests includes passing tests, but in general is not limited thereto.

Now suppose a developer makes a change to software and/or one or more tests and a build is performed. In this case, at least a subset of tests should be re-run. Screenshot 430 represents an exemplary situation in which tests "A," "B," "C," and "E" are shown as important to run in group 412 since they are impacted by a change. The remaining tests "D," "F," and "G" are provided in a separate group 422 for available tests. Further, note that that all tests are annotated with an encircled check mark denoting that the tests passed in a previous run.

Figure 5:
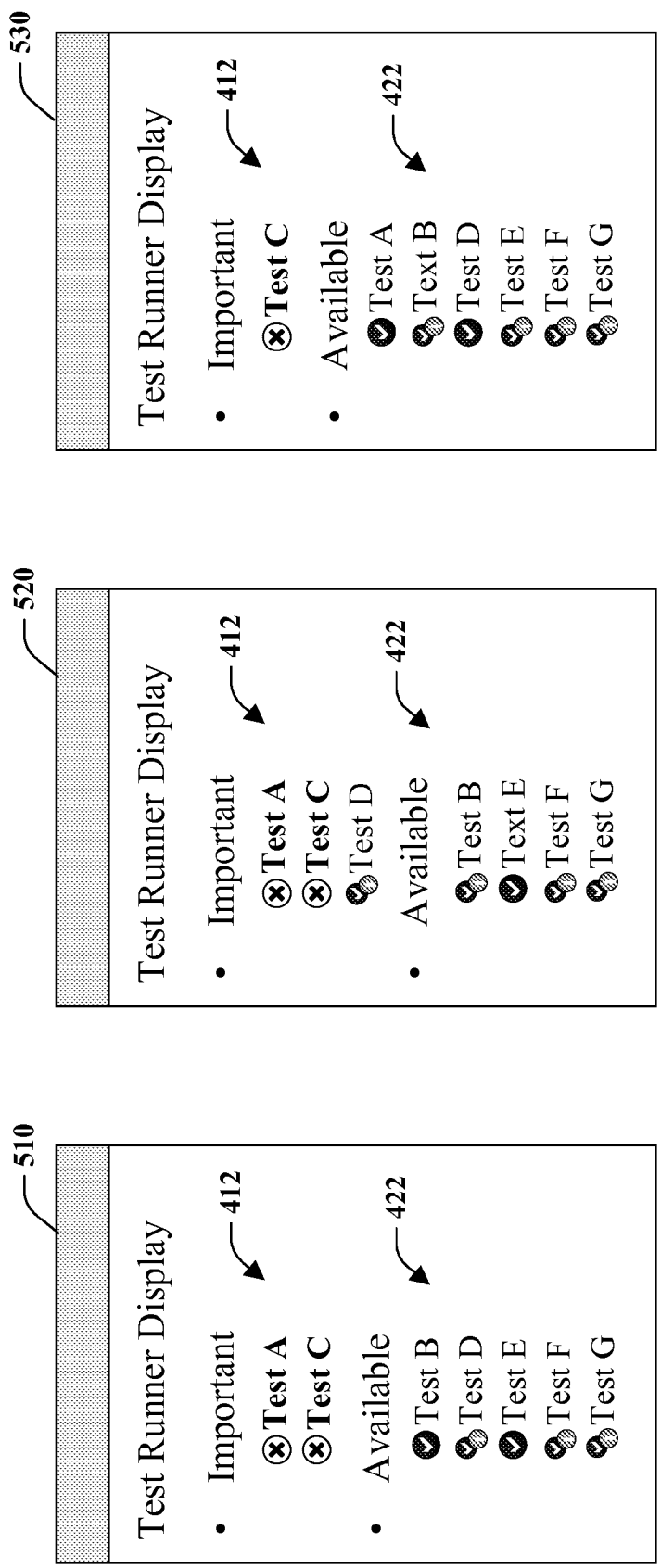
Figure 6:
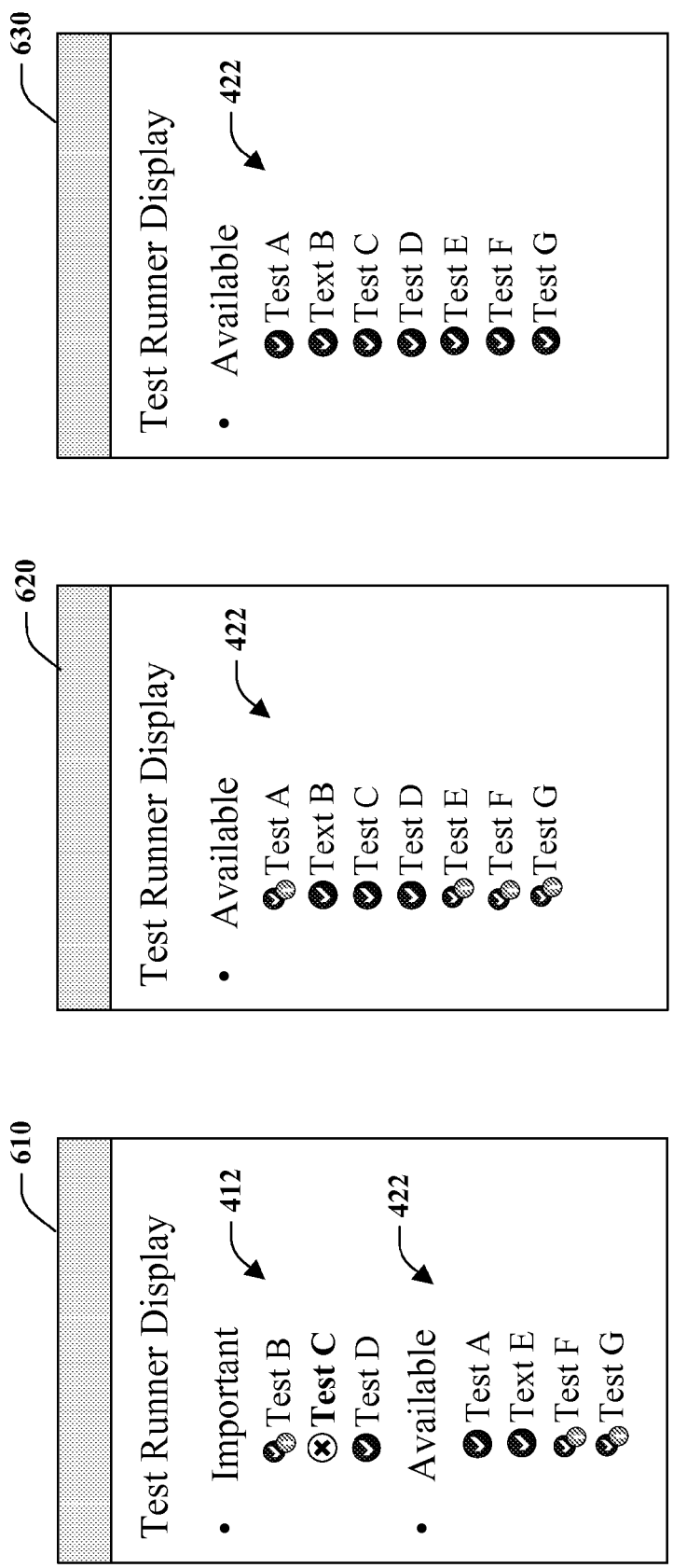

Upon running important tests "A," B," "C," and "E," the outcome can be that tests "A" and "C" now fail and tests "B" and "E" now pass. Since tests "A" and "C" failed, they can remain important. Screenshot 510 of FIG. 5 illustrates this situation. Here, tests "A" and "C" are listed in group 412 of important tests including a graphical icon indicating the tests failed in the last run. The remainder of the tests, namely, tests "B," "D," "E," "F," and "G," can be listed in group 422 corresponding to available tests and include graphical icons indicative of their state. Here, tests "D," "F," and "G" previously passed but where not re-run in the last test run. Accordingly, their status is passed and stale. Since tests "B" and E" passed the last test run they are annotated with the passed icon.

Now suppose tests and/or the software are modified and built again in an attempt to address the previous failure of tests "A" and C" are. It can be determined by way of impact analysis that tests "A," "C," and "D" are impacted by changes. Accordingly, these tests can be categorized as important and listed in group 412 including important tests. The remaining tests "B," "E," "F," and "G" can be listed in the group 422 corresponding to other available tests.

If the important tests are run, suppose that tests "A" and "D" pass but test "C" fails. As indicated in screenshot 530, test "C" can remain as an important test in the group 412, while tests "A" and "D" can be moved into the available test group 422 with an icon indicating the tests passed. All other tests, namely "B," "E," "F," and "G," can be marked as stale since they were not run.

Further changes can continue to be made updating tests and/or code and a build performed. Based on the changes it can be determined that tests "B," "C," and "D" are impacted by the changes. Accordingly, as shown in screenshot 610 in FIG. 6 tests "B," "C," and "D" can be categorized and listed as important tests in the group 412. The remaining tests are listed in the group 422 corresponding to available tests. Further, note that the tests are annotated with their last run state.

If the important tests are run, suppose tests "B," "C," and "D" pass. In this case, all tests have now passed and as such, there are no important tests. As shown in screenshot 620, all tests are now listed in the same group 422 of available tests. Further, tests "B," "C," and "D," are annotated with a graphical icon indicating they passed while the remaining tests are noted as stale.

At this point, it may be desired to run all tests. If all tests pass, the screenshot 630 can be presented indicating that all tests passed with a corresponding icon and listing in group 422 of available tests.

It is to be appreciated that while a user can expressly indicate that important tests be run, the process can be automatic. For example, if a user enables a continuous test runner mode, upon identification of important tests, execution of such tests can be initiated automatically.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push or pull model. The components may also interact with one or more other components not specifically described herein for the sake of brevity, but known by those of skill in the art.

Furthermore, various portions of the disclosed systems above and methods below can include artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanism can be employed by the categorization component 120 to facilitate identification of important tests, for instance by deriving data regarding a test that can be specified by a rule.

Figure 7:
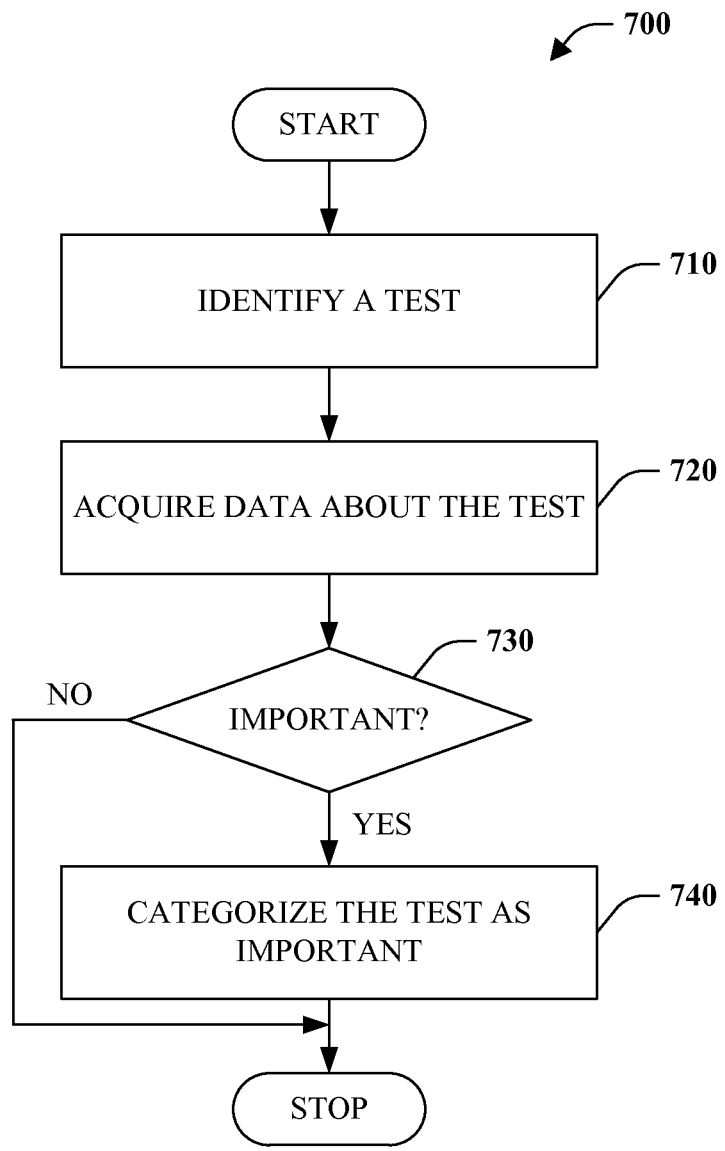
FIG. 7 is a flow chart diagram of a method of facilitating testing.
Figure 8:
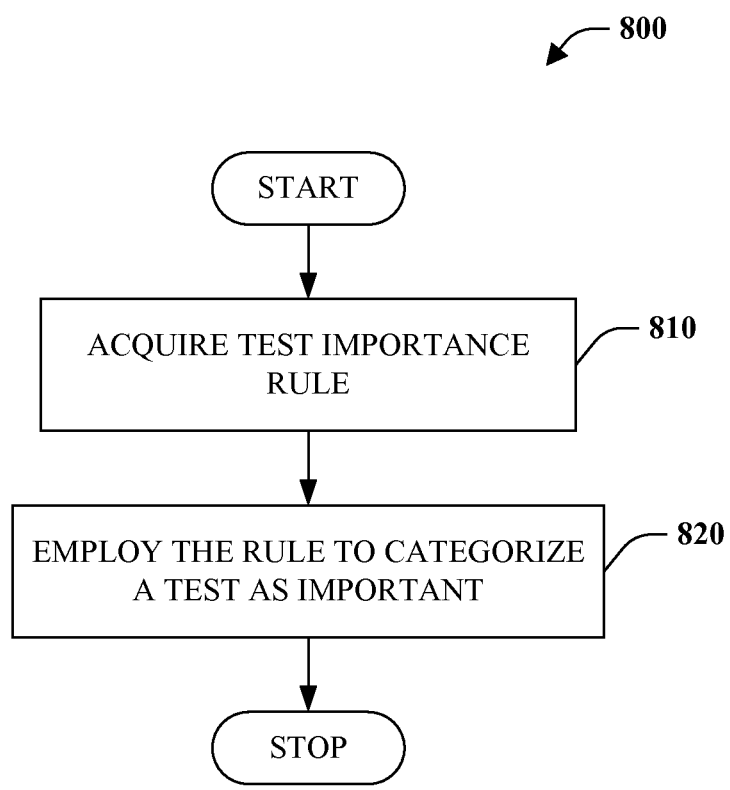
FIG. 8 is a flow chart diagram of a method of extending the definition of important.
Figure 9:
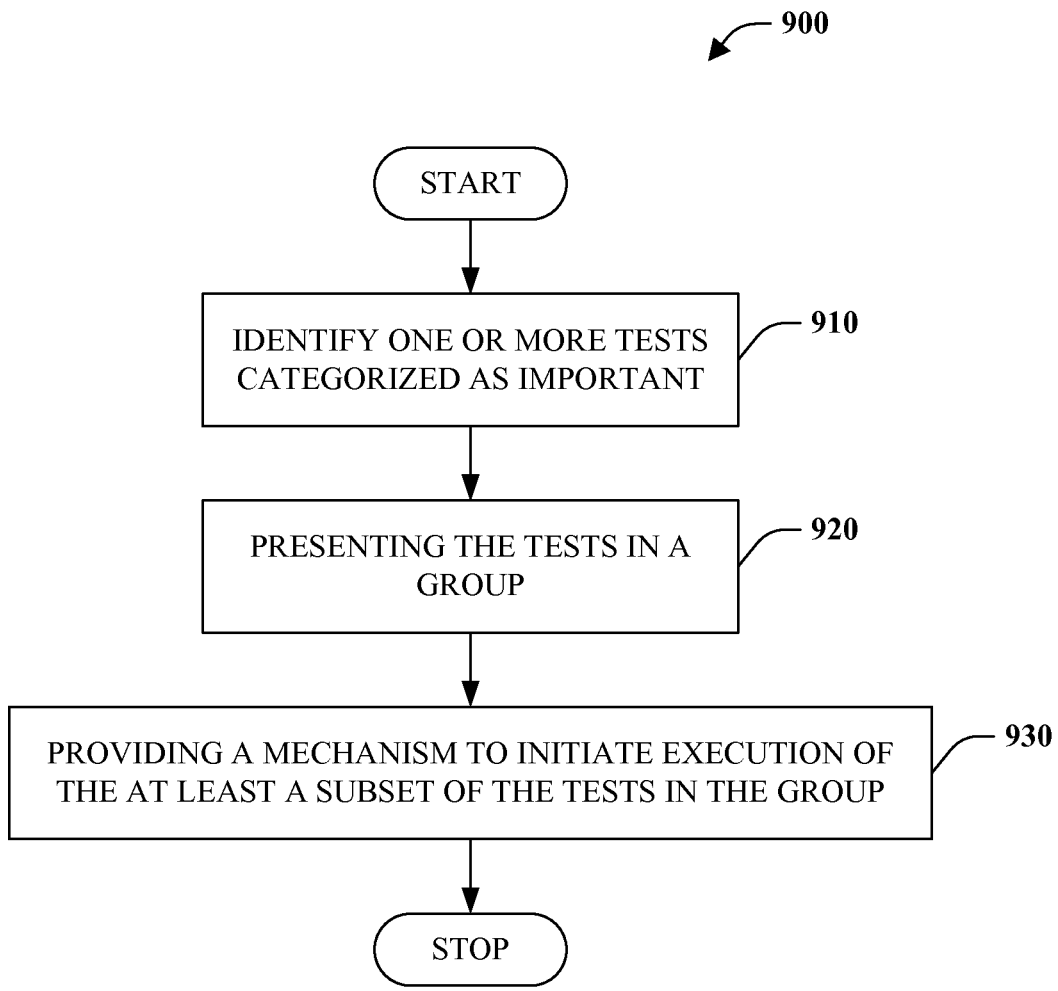
FIG. 9 is a flow chart diagram of a method of presenting tests.

In view of the exemplary systems described supra, methodologies that may be implemented in accordance with the disclosed subject matter will be better appreciated with reference to the flow charts of FIGS. 7-9. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 7, a method 700 of facilitating testing is illustrated. At reference numeral 710, a test associated with software can be identified. In one embodiment, the test can be a unit test. At numeral 720, data is acquired about the test such as its state (e.g., passed, failed, not yet passed . . . ) and/or other properties or characteristics (e.g., time since last passed, historical pass/fail ratio, statistical metrics regarding the test . . . ). By way of example, and not limitation, in one instance data can be provided about code coverage or, in other words, the lines of code that the test executes to facilitate impact analysis. At numeral 730, a determination is made as to whether the test is important, for example to run, based on the data acquired about the tests as well as one or more rules defining important (and optionally unimportant) tests. If, at 730, the test is unimportant ("NO"), the method can simply terminate. Alternatively, if, at 730, the test is determined to be important ("YES"), the method proceeds to 740 where the test is categorized, or classified, as important. Such categorization can correspond to setting a flag or writing a property, amongst other means, to denote the test is important.

FIG. 8 is a flow chart diagram of a method 800 of extending the definition of important. At reference numeral 810, a rule is acquired that provides a definition with respect to test importance. For example, the rule can specify that test is important if a test tends to fail (e.g., over last one hundred runs the test failed forty times) or if a test interacts with a portion of code that tends to result in failures. As another example, a rule may indicate that an otherwise important test is not important if the test is redundant. For instance, if a quick running unit test is important then a longer running functional test is not important if it has the same test coverage. At numeral 820, the newly acquired rule is employed to categorize a test as important. While a system may include default definitions of important with respect to tests, the method 800 provides a means for a customized importance definition, for example for a particular domain.

FIG. 9 depicts a method 900 of presenting tests. At reference numeral 910, one or more tests categorized as important are identified. For example, test properties can be queried for "important" or an important flag can be inspected. At numeral 920, the one or more identified tests are highlighted by presenting the tests in a group designated for important tests. Further, the tests can be annotated with information such as an icon indicative of the result of last execution (e.g., pass, fail . . . ). Furthermore, it is to be appreciated that important tests can be ordered in a particular manner and/or included within subgroups. At reference numeral 930, a mechanism is provided to initiate execution of at least a subset of the tests in the group designated for important tests. For example, a link can be provided or drop down menu item, wherein selection of the corresponding operation initiates test execution. Additionally or alternatively, the mechanism can be configured to operate in an automatic mode wherein upon identification of tests as important those tests are automatically run.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
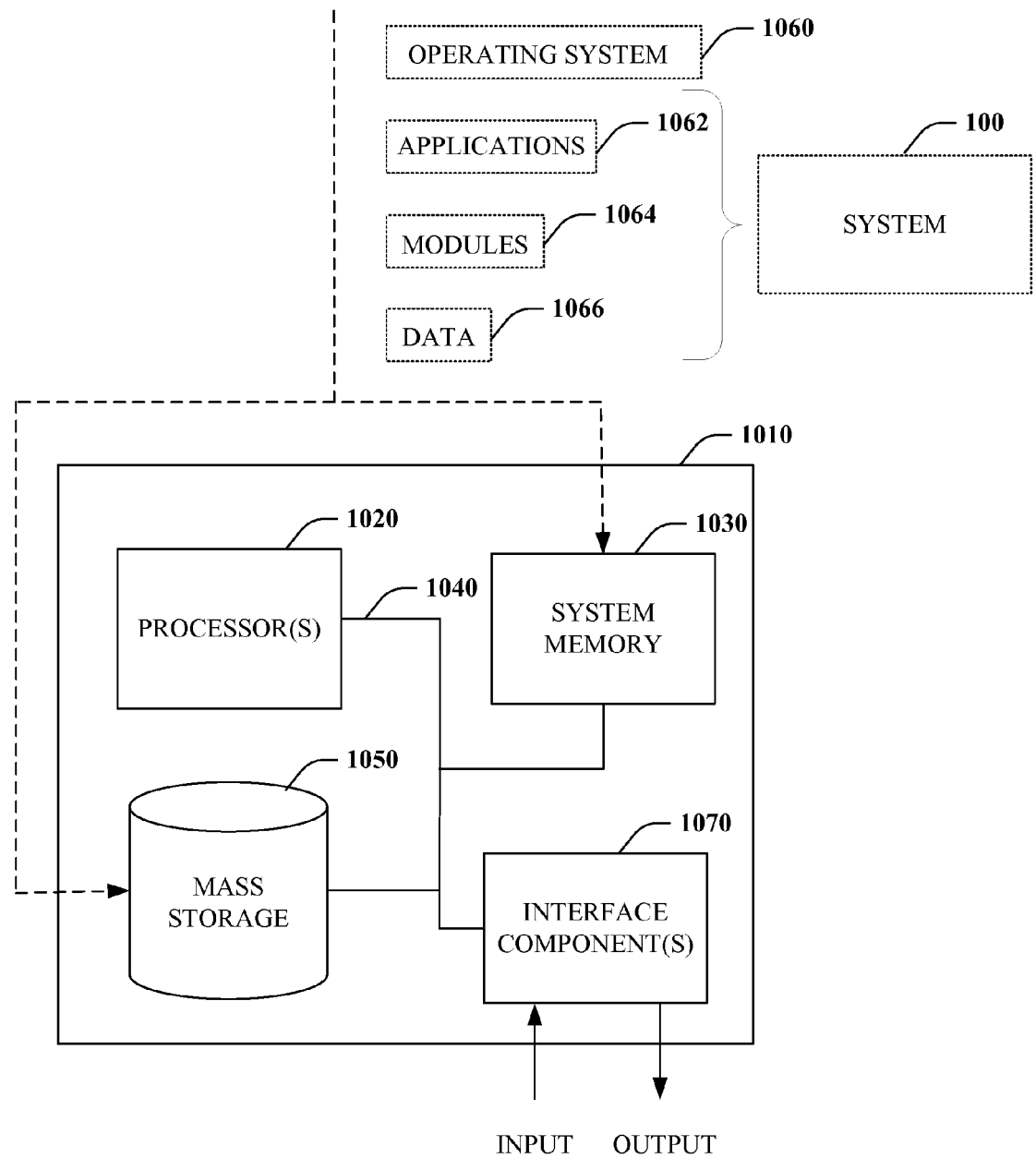
FIG. 10 is a schematic block diagram illustrating a suitable operating environment for aspects of the subject disclosure.

In order to provide a context for the claimed subject matter, FIG. 10 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tests and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 10, illustrated is an example general-purpose computer 1010 or computing device (e.g., desktop, laptop, server, hand-held, programmable consumer or industrial electronics, set-top box, game system . . . ). The computer 1010 includes one or more processor(s) 1020, memory 1030, system bus 1040, mass storage 1050, and one or more interface components 1070. The system bus 1040 communicatively couples at least the above system components. However, it is to be appreciated that in its simplest form the computer 1010 can include one or more processors 1020 coupled to memory 1030 that execute various computer executable actions, instructions, and or components stored in memory 1030.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration.

The computer 1010 can include or otherwise interact with a variety of computer-readable media to facilitate control of the computer 1010 to implement one or more aspects of the claimed subject matter. The computer-readable media can be any available media that can be accessed by the computer 1010 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1010.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1030 and mass storage 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 1010, such as during start-up, can be stored in nonvolatile memory, while volatile memory can act as external cache memory to facilitate processing by the processor(s) 1020, among other things.

Mass storage 1050 includes removable/non-removable, volatile/non-volatile computer storage media for storage of large amounts of data relative to the memory 1030. For example, mass storage 1050 includes, but is not limited to, one or more devices such as a magnetic or optical disk drive, floppy disk drive, flash memory, solid-state drive, or memory stick.

Memory 1030 and mass storage 1050 can include, or have stored therein, operating system 1060, one or more applications 1062, one or more program modules 1064, and data 1066. The operating system 1060 acts to control and allocate resources of the computer 1010. Applications 1062 include one or both of system and application software and can exploit management of resources by the operating system 1060 through program modules 1064 and data 1066 stored in memory 1030 and/or mass storage 1050 to perform one or more actions. Accordingly, applications 1062 can turn a general-purpose computer 1010 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the system 100 that facilitates testing, or portions thereof, can be, or form part, of an application 1062, and include one or more modules 1064 and data 1066 stored in memory and/or mass storage 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1010 also includes one or more interface components 1070 that are communicatively coupled to the system bus 1040 and facilitate interaction with the computer 1010. By way of example, the interface component 1070 can be a port (e.g., serial, parallel, PCMCIA, USB, Fire-Wire . . . ) or an interface card (e.g., sound, video . . . ) or the like. In one example implementation, the interface component 1070 can be embodied as a user input/output interface to enable a user to enter commands and information into the computer 1010 through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., CRT, LCD, plasma . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims

What is claimed is:

1. A method facilitating software testing, comprising:
    employing at least one processor configured to execute computer-executable instructions stored in memory to perform the following acts:
    identifying one or more predefined rules that define importance with respect to software tests based on one or more metrics associated with at least one of a test or software under test, wherein at least one of the one or more predefined rules defines a test as important if the test previously passed but has not passed within a predetermined time;
    categorizing one or more software tests as important or unimportant in ensuring software functions correctly at a given time as a function of the one or more predefined rules;
    displaying one or more tests categorized as important in a group; and
    providing a mechanism to initiate execution of the one or more tests categorized as important in the group.

2. The method of claim 1 further comprises categorizing the one or more software tests as a function of one or more configurable rules.

3. The method of claim 1 further comprises categorizing the one or more software tests as a function of one of the one or more predefined rules that defines the test as important if the test has not passed within a predetermined time.

4. The method of claim 1 further comprises categorizing the software test as a function of one of the one or more predefined rules that defines the test as important if the test executes over at least a portion of code that has changed.

5. The method of claim 1 further comprising ordering the group of two or more tests as a function of a test property.

6. The method of claim 1 further comprises displaying an identifier indicative of test execution state of each test classified as important.

7. The method of claim 1 further comprises denoting the test as important in source code of the test.

8. The method of claim 1 further comprises providing a mechanism to initiate execution of two or more tests categorized as important in the group in response to a single gesture.

9. A system, comprising:
    a processor coupled to a memory, the processor configured to execute the following computer-executable components stored in the memory:
    a categorization component that identifies one or more software tests as important to run based on one or more predefined rules that define importance as a function of one or more metrics associated with at least one of a test or software under test, wherein at least one of the one or more predefined rules defines a test as important if the test previously passed but has not passed within a predetermined time; and
    an interface component that displays one or more software tests, identified as important to run at a given time in a testing workflow as a function of the one or more predefined rules, in a group designated solely to important tests and distinct from unimportant tests, and provides a mechanism to initiate execution of the one or more software tests in the group designated solely for important tests.

10. The system of claim 9, the interface component further displays the one or more software tests in one or more sub-groups of the group.

11. The system of claim 9, the interface component further displays the one or more software tests in a predetermined order.

12. The system of claim 9, the interface component further displays an identifier indicative of test state for at least one or the one or more software tests.

13. The system of claim 9, one of the one or more software tests is identified as important to run if code over which the test operates changes.

14. The system of claim 9, the interface component further provides a mechanism to initiate execution of two or more of the one or more software tests in the group in response to a single gesture.

15. A computer-readable storage medium having instructions stored thereon that enable at least one processor to perform a method upon execution of the instructions, the method comprising:

identifying one or more predefined rules that define importance with respect to software tests based on one or more metrics associated with at least one of a test or software under test, wherein at least one of the one or more predefined rules defines a test as important if the test previously passed but has not passed within a predetermined time;

categorizing a unit test as important or unimportant as a function of the one or more predefined rules; and providing a mechanism to initiate execution of a group of one or more unit tests categorized as important.

16. The computer-readable storage medium of claim 15, the method further comprises categorizing the unit test as important based on a rule if code over which the test operates changes.

17. The computer-readable storage medium of claim 15, the method further comprises displaying a group of unit tests categorized as important.

18. The computer-readable storage medium of claim 15 further comprises providing a mechanism to initiate execution of a group of two or more unit tests categorized as important in response to a single gesture.

* * * * *